US008137547B2

(12) United States Patent  
Nilsen et al.

(10) Patent No.: US 8,137,547 B2  
(45) Date of Patent: Mar. 20, 2012

(54) FLUID TREATMENT TANK AND A WELL FLUID PROCESSING SYSTEM COMPRISING SUCH A TANK

(75) Inventors: Pål Jahre Nilsen, Bødalen (NO); Matteo Chiesa, Somerville, MA (US); Peder Hansson, Jar (NO); Helge Andersen, Slependen (NO)

(73) Assignee: Hamworthy PLC, Poole (GB)

( * ) Notice: Subject to any disclaimer, the term of this patent is extended or adjusted under 35 U.S.C. 154(b) by 565 days.

(21) Appl. No.: 12/293,033

(22) PCT Filed: Mar. 14, 2007

(86) PCT No.: PCT/IB2007/000627  
§ 371 (c)(1),  
(2), (4) Date: Mar. 24, 2009

(87) PCT Pub. No.: WO2007/105086  
PCT Pub. Date: Sep. 20, 2007

(65) Prior Publication Data  
US 2009/0211960 A1    Aug. 27, 2009

(30) Foreign Application Priority Data  
Mar. 15, 2006    (NO) .................................. 20061206

(51) Int. Cl.  
*B01D 17/025* (2006.01)
(52) U.S. Cl. ............... 210/182; 210/202; 210/221.2; 210/243; 210/255; 210/512.1; 210/519; 210/521; 210/532.1; 210/539; 210/540
(58) Field of Classification Search .................. 210/177, 210/180, 182, 188, 202, 221.2, 243, 255, 210/259, 260, 512.1, 519, 521, 522, 532.1, 210/538, 539, 540; 166/75.12; 204/547  
See application file for complete search history.

(56) References Cited

U.S. PATENT DOCUMENTS  
863,168 A * 8/1907 Griswold ...................... 210/521  
(Continued)

FOREIGN PATENT DOCUMENTS  
EP    1 208 897    5/2002  
(Continued)

OTHER PUBLICATIONS  
International Search Report, dated Jul. 3, 2007, issued in connection with counterpart International Application No. PCT/IB2007/000627.

(Continued)

*Primary Examiner* — Christopher Upton  
(74) *Attorney, Agent, or Firm* — Venable LLP; Eric J. Franklin (57) ABSTRACT

A fluid treatment tank for use in a well fluid processing system. The tank is divided into at least three compartments, including an oil treatment compartment for receiving oil from a separator vessel of the well fluid processing system so as to allow stabilization and/or final separation and treatment of the oil, a reject treatment compartment for receiving reject fluid from one or more water treatment units of the well fluid processing system so as to allow gravitational separation of heavier and lighter components of the reject fluid, and a water treatment compartment for receiving de-oiled water from one or more water treatment units of the well fluid processing system so as to allow degassing and/or final separation of the water. Also, a well fluid processing system including such a fluid treatment tank.

33 Claims, 3 Drawing Sheets

U.S. PATENT DOCUMENTS

| | | | | |
|---|---|---|---|---|
| 1,442,306 | A * | 1/1923 | Stonebreaker | 210/255 |
| 1,763,412 | A * | 6/1930 | Tark | 210/525 |
| 2,118,157 | A * | 5/1938 | Camp | 210/519 |
| 3,759,324 | A | 9/1973 | Mecusker | |
| 4,247,312 | A * | 1/1981 | Thakur et al. | 210/522 |
| 4,378,290 | A * | 3/1983 | Kennedy, Jr. | 210/260 |
| 4,483,774 | A * | 11/1984 | Brill et al. | 210/540 |
| 5,302,294 | A * | 4/1994 | Schubert et al. | 210/259 |
| 5,415,776 | A * | 5/1995 | Homan | 210/519 |
| 5,656,173 | A | 8/1997 | Jordan et al. | |
| 5,679,265 | A * | 10/1997 | Van Schie | 210/521 |
| 5,860,767 | A | 1/1999 | Atkins | |
| 5,935,445 | A | 8/1999 | Febres | |
| 5,996,604 | A * | 12/1999 | Doelle et al. | 210/255 |
| 6,132,494 | A * | 10/2000 | Kjos et al. | 210/188 |
| 6,214,220 | B1 * | 4/2001 | Favret, Jr. | 210/260 |
| 6,315,898 | B1 * | 11/2001 | Bull | 210/521 |
| 6,592,753 | B2 * | 7/2003 | Lee | 210/255 |
| 6,827,865 | B1 * | 12/2004 | Fenwick | 210/521 |
| 7,141,162 | B2 * | 11/2006 | Garner et al. | 210/521 |
| 7,175,748 | B2 * | 2/2007 | Michaelsen et al. | 204/547 |

FOREIGN PATENT DOCUMENTS

| | | |
|---|---|---|
| EP | 1 335 784 | 12/2004 |
| GB | 2 385 009 | 8/2003 |
| WO | WO 99/25454 | 5/1999 |
| WO | WO 00/51707 | 9/2000 |
| WO | WO 03/039706 | 5/2003 |

OTHER PUBLICATIONS

Written Opinion of the International Searching Authority, dated Jul. 3, 2007, issued in connection with counterpart International Application No. PCT/IB2007/000627.

Norwegian search report issued in priority Norwegian patent application, Oct. 6, 2006.

* cited by examiner

FLUID TREATMENT TANK AND A WELL FLUID PROCESSING SYSTEM COMPRISING SUCH A TANK

CROSS-REFERENCE TO RELATED APPLICATIONS

This application claims priority to Norwegian patent application 20061206 filed 15 Mar. 2006 and is the national phase under 35 U.S.C. §371 of PCT/IB2007/000627 filed 14 Mar. 2007.

FIELD OF THE INVENTION AND PRIOR ART

The present invention relates to a fluid treatment tank for use in a well fluid processing system. The invention also relates to a well fluid processing system comprising such a fluid treatment tank.

Well fluid including a mixture of oil, water and gas is normally subjected to a three-stage gravitational separation process before oil of exportable quality, e.g. stabilized oil having a water content of 0.5% by volume or lower, is obtained. Each of said stages involves gravitational separation in a separator vessel, which implies that the oil has to pass through three separator vessels before being exported. This type of process is time-consuming and requires a very bulky separator installation. The water withdrawn from the respective separator vessel is conventionally subjected to purification in a water treatment unit such as a hydrocyclone, in which the oil content of the water may be reduced to such a low level that the water will be allowed to be discharged to the sea.

SUMMARY OF THE INVENTION

The object of the present invention is to provide a beneficial fluid treatment tank for use in a well fluid processing system.

According to the invention, this object is achieved by a fluid treatment tank.

The inventive fluid treatment tank is divided into at least three compartments, including:
- an oil treatment compartment for receiving oil from a separator vessel of the well fluid processing system so as to allow stabilization and/or final separation and treatment of the oil;
- a reject treatment compartment for receiving reject fluid from one or more water treatment units of the well fluid processing system so as to allow gravitational separation of heavier and lighter components of the reject fluid; and
- a water treatment compartment for receiving de-oiled water from one or more water treatment units of the well fluid processing system so as to allow degassing of the water.

Hereby, it will be possible to perform three different fluid treatment processes of a well fluid processing system in one and the same tank, which will save space and make possible a comparatively compact design of the system.

According to an embodiment of the invention, said compartments are mutually separated from each other in such a manner that fluid is allowed to flow from the upper part of the reject treatment compartment into the oil treatment compartment, but prevented from flowing from the upper part of the reject treatment compartment into the water treatment compartment. Hereby, oil accumulated in the upper layer of the fluid volume in the reject treatment compartment during the gravitational separation of the reject fluid will be allowed to flow over to the oil treatment compartment in order to form part of the export oil to be delivered from the oil treatment compartment. Thus, beneficial treatment of the reject fluid under utilization of the oil content thereof is made possible.

According to another embodiment of the invention, said compartments are also mutually separated from each other in such a manner that fluid is allowed to flow from the upper part of the water treatment compartment into the reject treatment compartment. Hereby, oil accumulated in the upper layer of the fluid volume in the water treatment compartment will be allowed to flow over to the reject treatment compartment so as to subsequently flow over to the oil treatment compartment from the reject treatment compartment. Thus, beneficial utilization of the oil content thereof is made possible.

According to another embodiment of the invention, the reject treatment compartment is provided with an outlet at its lower part, preferably at the bottom thereof, which outlet is connected to an inlet of the water treatment compartment so as to allow fluid withdrawn from the lower part of the reject treatment compartment via said outlet to be introduced in the water treatment compartment via said inlet. Hereby, water separated from reject fluid in the reject treatment compartment will be subjected to further treatment in the water treatment compartment before leaving the fluid treatment tank, e.g. in order to be discharged to the sea.

According to another embodiment of the invention, the oil treatment compartment is provided with an outlet at its lower part, preferably at the bottom thereof, which outlet is connected to an inlet of the water treatment compartment so as to allow fluid withdrawn from the lower part of the oil treatment compartment via said outlet to be introduced in the water treatment compartment via said inlet. Hereby, water separated from oil in the oil treatment compartment will be subjected to further treatment in the water treatment compartment before leaving the fluid treatment tank, e.g. in order to be discharged to the sea.

According to another embodiment of the invention, the tank is provided with bubble producing means for producing gas bubbles in water introduced into or accumulated in the water treatment compartment so as to promote the flotation of oil droplets contained in water received in the water treatment compartment. Hereby, a further separation of oil from water in the water treatment compartment will be facilitated, which will make possible a reduction of the oil content of the water.

According to another embodiment of the invention, the reject treatment compartment is provided with an inlet for receiving said reject fluid, wherein:
- a centrifugal inlet pipe is connected to said inlet, reject fluid being guided into the reject treatment compartment through this inlet pipe in a helical flow path therein so as to thereby allow immiscible fluid components of different specific gravities included in the reject fluid to migrate, under the action of centrifugal forces, towards mutually different parts of the inlet pipe;
- a first outlet opening is arranged at the downstream end of the inlet pipe; and
- second outlet openings are arranged in the wall of the inlet pipe upstream of the first outlet opening so as to allow heavier fluid components of the reject fluid to be discharged, under the action of centrifugal forces, from the inlet pipe through the second outlets upstream of the first outlet opening.

Hereby, a part of the water contained in reject fluid entering the reject treatment compartment via the inlet pipe will be discharged into the reject treatment compartment via said second outlet openings of the inlet pipe, whereas the major part of the lighter oil contained in said reject fluid will be discharged into the reject treatment compartment via said first outlet opening of the inlet pipe. Thus, an initial separation of oil and water of reject fluid may be accomplished as the reject fluid flows into the reject treatment compartment, which will speed up the separation process in the reject treatment compartment. The inlet pipe will also influence oil droplets of the reject fluid to form oil droplets of bigger size that will migrate easier to the surface of the fluid in the reject treatment compartment.

The invention also relates to a well fluid processing system, which system comprises at least one separator vessel for gravitational separation of oil and water contents of well fluid, a water treatment unit for de-oiling water withdrawn from the separator vessel and a fluid treatment tank of the inventive type. The oil treatment compartment of the fluid treatment tank is connected to the separator vessel so as to receive oil withdrawn from the separator vessel, the reject treatment compartment of the fluid treatment tank is connected to the water treatment unit so as to receive reject fluid withdrawn from the water treatment unit, and the water treatment compartment of the fluid treatment tank is connected to the water treatment unit so as to receive water de-oiled by the water treatment unit.

The inventive system is well suited for use in topside as well as subsea installations for processing well fluids.

According to an embodiment of the invention, the system comprises a separation unit, which is arranged between the separator vessel and the water treatment unit and which is arranged to receive water withdrawn from the separator vessel. The separation unit comprises bubble producing means for producing micro-sized gas bubbles in said water, said gas bubbles being allowed to migrate through the water so as to come into contact with and carry along oil droplets included in the water, the separation unit further comprising an extraction device for withdrawing the gas bubbles and said oil droplets from the water in the separation unit so as to thereby reduce the oil content of the water passing through the separation unit. The water de-oiled by the separation unit is then supplied to the water treatment unit for further purification.

In this description and the subsequent claims, the term "micro-sized gas bubbles" refers to small gas bubbles having a diameter smaller than 100 µm. In the following, the "micro-sized gas bubbles" will also be referred to as "micro bubbles".

Oil drops will adhere to the micro bubbles produced in the water in the separation unit and will be carried along by the micro bubbles in order to be withdrawn from the water together with the micro bubbles. The use of small micro-sized gas bubbles gives a large possible contact surface between gas bubbles and oil droplets. The separation unit is capable of coping with water having an oil concentration substantially exceeding the maximum allowed oil concentration of conventional water treatment units, such as hydrocyclones. The introduction of the separation unit between the separator vessel and the water treatment unit will make it possible to obtain the desired oil quality by a one-stage gravitational separation by a suitable adjustment of the residence time for the oil in the separator vessel, while allowing a reduced residence time for the water in the separator vessel and thus a higher content of oil in the water withdrawn from the separator vessel. In order to cope with the water quality required for the water treatment unit, the water withdrawn from the separator vessel is subjected to de-oiling in the separation unit so as to reduce the oil content of the water to a sufficient extent before the water is fed into the water treatment unit.

Further advantages as well as advantageous features of the inventive system will appear from the following description and the dependent claims.

BRIEF DESCRIPTION OF THE DRAWINGS

With reference to the appended drawings, a specific description of preferred embodiments of the invention cited as examples follows below.

In the drawings.

DETAILED DESCRIPTION OF PREFERRED EMBODIMENTS OF THE INVENTION

Figure 1:
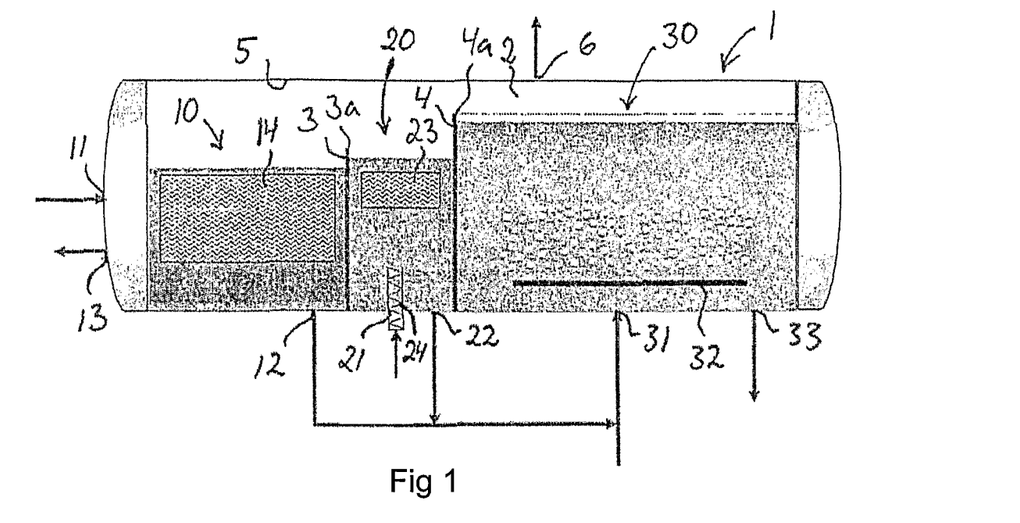
FIG. 1 is a schematic illustration of a fluid treatment tank according to an embodiment of the present invention, as seen in a longitudinal section.

A fluid treatment tank 1 according to an embodiment of the present invention for use in a well fluid processing system is schematically illustrated in FIG. 1. In the illustrated embodiment, the tank 1 is divided into three compartments 10, 20, 30. Said compartments comprise:

- an oil treatment compartment 10 for receiving oil from a separator vessel of the well fluid processing system so as to allow final separation (such as polishing) and/or stabilization of the oil to a certain pressure and/or temperature;
- a reject treatment compartment 20 for receiving reject fluid from one or more water treatment units of the well fluid processing system so as to allow gravitational separation of heavier and lighter components of the reject fluid; and
- a water treatment compartment 30 for receiving de-oiled water from one or more water treatment units of the well fluid processing system so as to allow degassing and/or final separation (such as polishing) of the water.

The water treatment compartment 30 is provided with an inlet 31, suitably at its lower part, through which water de-oiled by a water treatment unit is to be feed into the water treatment compartment. When entering the water treatment compartment 30, the water is subjected to a pressure fall which deploys the gas contained in the water and creates small bubbles. These bubbles enhance the separation of remaining oil from the water. The tank 1 may be provided with bubble producing means 32 for producing gas bubbles in water introduced into or accumulated in the water treatment compartment 30 so as to promote the flocculation and flotation of oil droplets contained in water received in the water treatment compartment, as illustrated in FIG. 1. The bubble producing means 32 may comprise nozzles, not shown, arranged to inject gas jets into the water treatment compartment 30 so as to thereby generate said gas bubbles. The injection gas may for instance be natural gas. Gas contained in water entering the water treatment compartment and gas injected into the water of the water treatment compartment will rise through the water and up to the common gas space 2 at the top of the tank 1. Oil contained in water entering the water treatment compartment will rise to the top of the water volume in the water treatment compartment so as to form an upper oil layer therein. Water having a low content of oil will be accumulated in the lower part of the water treatment compartment. The water treatment compartment 30 is provided with a water outlet 33 at its lower part, preferably at the bottom thereof, through which water accumulated in the lower part of the water treatment compartment can be withdrawn from the tank 1, e.g. in order to be discharged to sea.

The reject treatment compartment 20 is provided with an inlet 21, suitably at its lower part, for receiving the above-mentioned reject fluid. The reject fluid constitutes a mixture of water, oil and gas. The reject fluid is subjected to gravitational separation in the reject treatment compartment 20. Gas contained in reject fluid entering the reject treatment compartment will rise through the fluid and up to the space 2 at the top of the tank 1. Oil contained in reject fluid entering the reject treatment compartment will rise to the top of the fluid volume in the reject treatment compartment so as to form an upper oil layer therein. Water having a low content of oil will be accumulated in the lower part of the reject treatment compartment. The reject treatment compartment 20 is provided with an outlet 22 at its lower part, preferably at the bottom thereof, through which water accumulated in the lower part of the reject treatment compartment can be withdrawn from the reject treatment compartment. In the illustrated example, the outlet 22 is connected to the inlet 31 of the water treatment compartment 30 so as to allow fluid withdrawn from the lower part of the reject treatment compartment via said outlet 22 to be introduced in the water treatment compartment via said inlet 31 by means of a pump or an ejector.

A coalescing device 23 may with advantage be arranged in the upper part of the reject treatment compartment 20 where the water/oil mixture is expected to be oil continuous, as illustrated in FIG. 1, in order to promote coalescence of water droplets in this water/oil mixture. This coalescing device suitably has the form of a dielectrophoresis unit 23, which has at least one pair of sheets spaced close to each other with the mutual distance between the sheets varying along the sheets as seen in a direction perpendicular to the intended flow direction of fluid passing between the sheets. The varying mutual distance between the sheets is suitably accomplished by the use of undulating sheets. An electrical potential is applied to the sheets so as to force water droplets in oil accumulated in the upper part of the reject treatment compartment into predetermined passage portions between the sheets in order to form fluid sections with enhanced water content. Such a dielectrophoresis unit 23 is more closely described in GB 2 385 009 A.

In the embodiment illustrated in FIG. 1, as an example, a centrifugal inlet pipe 24 is mounted in the inlet 21 of the reject treatment compartment to enhance separation. Reject fluid received by said inlet 21 is guided into the reject treatment compartment through this inlet pipe 24 in a helical path therein. The inlet pipe 24 is illustrated in closer detail in FIG. 2. The inlet pipe 24 is designed to guide the reject fluid in a helical path through the inlet pipe so as to thereby allow immiscible fluid components of different specific gravities included in the reject fluid to migrate, under the action of centrifugal forces, towards mutually different parts of the inlet pipe. The inlet pipe 24 may for instance be spirally wound so as to make reject fluid rotate as the reject fluid flows through it. A first outlet opening 25 is arranged at the downstream end of the inlet pipe 24, and second outlet openings 26 are arranged in the outer wall 27 of the inlet pipe upstream of the first outlet opening 25 so as to allow heavier fluid components of the reject fluid to be discharged, under the action of centrifugal forces generated when the reject fluid rotates in the inlet pipe, from the inlet pipe 24 into the reject treatment compartment 20 upstream of the first outlet opening 25.

Figure 2:
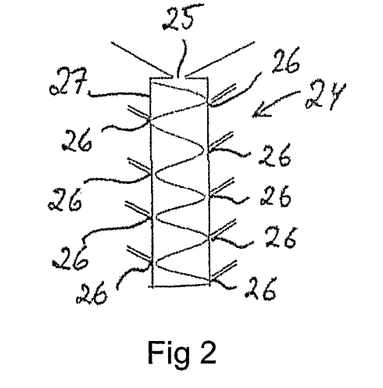
FIG. 2 is a schematic illustration of a centrifugal inlet pipe included in the fluid treatment tank of FIG. 1, as seen in a longitudinal section.

In the illustrated embodiment, the inlet pipe 24 is vertically arranged and extends into the reject treatment compartment 20. However, the inlet pipe 24 may alternatively be horizontally arranged or inclined and may also be arranged so as to extend only outside the fluid treatment tank 1.

The oil treatment compartment 10 is provided with an oil inlet 11, through which oil withdrawn from a separator vessel is to be feed into the oil treatment compartment. Water contained in oil entering the oil treatment compartment 10 will sink to the bottom of the oil treatment compartment so as to form a lower water layer therein. The oil treatment compartment 10 is provided with a water outlet 12 at its lower part, preferably at the bottom thereof, through which water accumulated in the lower part of the oil treatment compartment can be withdrawn from the oil treatment compartment. In the illustrated example, the outlet 12 is connected to the inlet 31 of the water treatment compartment 30 so as to allow fluid withdrawn from the lower part of the oil treatment compartment via said outlet 12 to be introduced in the water treatment compartment via said inlet 31 by means of a pump or an ejector. The oil treatment compartment 10 is provided with an oil outlet 13 through which stabilized oil can be withdrawn from the tank 1, e.g. in order to be exported. The oil outlet 13 is located on a higher level in the oil treatment compartment 10 than the water outlet 12.

A coalescing device 14 may with advantage be arranged in the oil treatment compartment 10, as illustrated in FIG. 1, in order to promote coalescence of water droplets in oil accumulated in the oil treatment compartment 10. This coalescing device suitably has the form of a dielectrophoresis unit 14, which has at least one pair of sheets spaced close to each other with the mutual distance between the sheets varying along the sheets as seen in a direction perpendicular to the intended flow direction of fluid passing between the sheets. The varying mutual distance between the sheets is suitably accomplished by the use of undulating sheets. An electrical potential is applied to the sheets so as to force water droplets in oil accumulated in the oil treatment compartment into predetermined passage portions between the sheets in order to form fluid sections with enhanced water content. Such a dielectrophoresis unit 14 is more closely described in GB 2 385 009 A.

The above-mentioned compartments 10, 20, 30 are mutually separated from each other in such a manner that fluid is allowed to flow from the upper part of the water treatment compartment 30 into the reject treatment compartment 20 and from the upper part of the reject treatment compartment 20 into the oil treatment compartment 10, but prevented from flowing from the upper part of the reject treatment compartment 20 into the water treatment compartment 30. This is with advantage accomplished by means of partition walls 3, 4 as illustrated in FIG. 1. The reject treatment compartment 20 is separated from the oil treatment compartment 10 by a first partition wall 3, which has an upper edge 3a located below the ceiling 5 of the tank 1 so as to allow fluid to flow over said upper edge 3a from the upper part of the reject treatment compartment 20 into the oil treatment compartment 10. Furthermore, the reject treatment compartment 20 is separated from the water treatment compartment 30 by a second partition wall 4, which has an upper edge 4a located below the ceiling 5 of the tank so as to allow fluid to flow over said upper edge 4a from the upper part of the water treatment compartment 30 into the reject treatment compartment 20. The upper edge 3a of the first partition wall 3 is located on a lower level in the tank than the upper edge 4a of the second partition wall 4. Thus, oil accumulated in an upper fluid layer in the water treatment compartment 30 will be allowed to flow over the edge 4a of the second partition wall 4 so as to fall down into the reject treatment compartment 20 and oil accumulated in an upper layer in the reject treatment compartment 20 will be allowed to flow over the edge 3a of the first partition wall 3 so as to fall down into the oil treatment compartment 10.

A gas outlet 6 is arranged at the upper part of the tank 1, preferably at the ceiling 5 of the tank. Gas accumulated in the space 2 at the upper part of the tank 1 can be withdrawn from the tank through this gas outlet 6.

Figure 3:
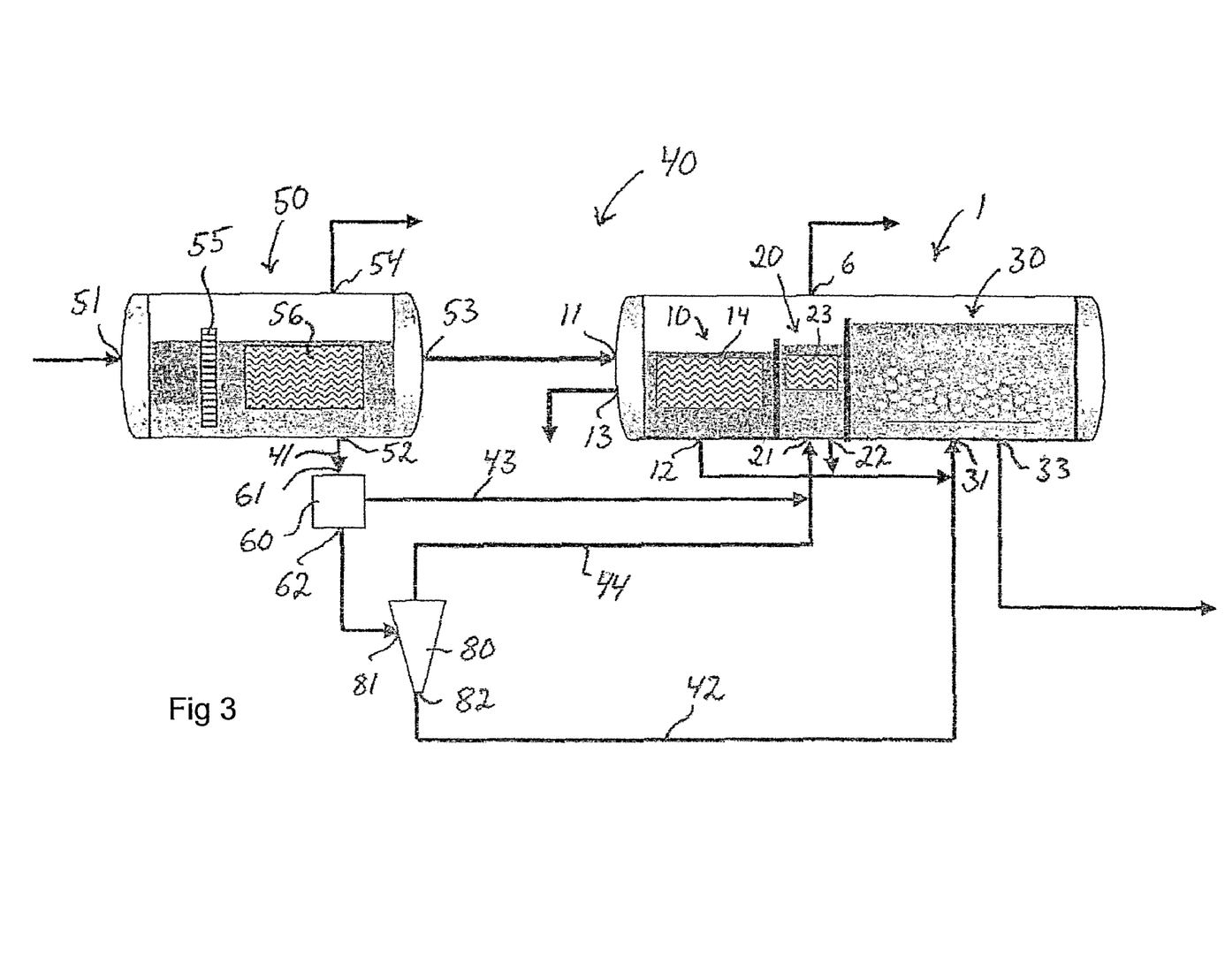
FIG. 3 is a schematic outline diagram illustrating a well fluid processing system according to a first embodiment of the present invention.

An embodiment of a well fluid processing system 40 for separating water, oil and gas of well fluid emanating from a well, e.g. a subsea well, is schematically illustrated in FIG. 3. The processing system 40 comprises a high-pressure separator vessel 50 for gravitational separation. The separator vessel 50 has an inlet 51 for receiving said well fluid, a first outlet 52 for withdrawing water from a lower part of the separator vessel, a second outlet 53 for withdrawing oil from a higher part of the separator vessel, and a third outlet 54 for withdrawing gas from an upper part of the separator vessel. In order to speed up the gravitational separation, the separator vessel 50 comprises a coalescing device in the form of a coalescing unit 55 having a plurality of flow channels, such as tubes, to which an electrical potential is applied so as to cause water droplets in the well fluid flowing through the flow channels to coalesce into larger droplets. Such a coalescing unit 55 is more closely described in WO 03/039806 A1 and GB 2 385 009 A. In the illustrated example, the separator vessel 50 also comprises a coalescing device in the form of a dielectrophoresis unit 56 arranged in the separator vessel downstream of the coalescing unit 55. The dielectrophoresis unit 56 has at least one pair of sheets spaced close to each other with the mutual distance between the sheets varying along the sheets as seen in a direction perpendicular to the intended flow direction of fluid passing between the sheets. The varying mutual distance between the sheets is suitably accomplished by the use of undulating sheets. An electrical potential is applied to the sheets so as to force the water droplets in the well fluid into predetermined passage portions between the sheets in order to form fluid sections with enhanced water content. Such a dielectrophoresis unit 56 is more closely described in GB 2 385 009 A.

The processing system 40 also comprises an inline separation unit 60 arranged to receive water withdrawn from the separator vessel 50 via the first outlet 52. The inline separation unit 60 comprises bubble producing means, not shown in FIG. 3, for producing micro-sized gas bubbles in said water. The gas bubbles migrate through the water and come into contact with and carry along oil droplets included in the water. The separation unit 60 further comprises an extraction device, not shown in FIG. 3, for withdrawing the gas bubbles and said oil droplets from the water in the separation unit 60 so as to thereby reduce the oil content of the water. The separation unit 60 is preferably designed so as to be capable of treating water having an oil content of up to 3% by volume.

Furthermore, the processing system 40 is provided with a water treatment unit 80, which is arranged to receive water from the separation unit 60 and which is capable of reducing the oil content of the water to 40 ppm or lower. The water treatment unit 80 preferably comprises one or several hydrocyclones. As an alternative, the water treatment unit may comprise one or several separating apparatuses of the type described in EP 1 335 784 B1 and EP 1 208 897 A1 or one or several centrifugal separators.

The separation unit 60 is connected between the first outlet 52 of the separator vessel 50 and the inlet 81 of the water treatment unit 80. The inlet 61 of the separation unit 60 is connected to said first outlet 52 of the separator vessel 50 so as to receive water withdrawn from the separator vessel, and the outlet 62 of the separation unit 60 is connected to the inlet 81 of the water treatment unit 80 so as to supply water that has passed through the separation unit 60 to the water treatment unit 80 for further separation therein.

The processing system 40 also comprises a low-pressure fluid treatment tank 1 of the type described above with reference to FIG. 1. The inlet 31 of the water treatment compartment 30 of the tank 1 is connected to the outlet 82 of the water treatment unit 80 so as to receive water that has passed through the water treatment unit. The inlet 21 of the reject treatment compartment 20 of the tank 1 is connected to the separation unit 60 and to the water treatment unit 80 so as to receive reject fluid withdrawn by the extraction device of the separation unit from the water passing through the separation unit 60 and reject fluid withdrawn from the water passing through the water treatment unit 80. The inlet 11 of the oil treatment compartment 10 of the tank 1 is connected to the oil outlet 53 of the separator vessel 50 so as to receive oil withdrawn from the separator vessel 50.

The processing system 40 is intended to process well fluid comprising a mixture of oil, natural gas and water under pressure. This fluid mixture is, via the inlet 51, received in the separator vessel 50, where the pressure is reduced and the fluid mixture is subjected to a first separating stage in the form of a gravitational separation in order to separate oil, water and gas. The separated gas is withdrawn from the separator vessel 50 via the third outlet 54 and subjected to dewatering and other types of treatment before being passed through various compressor stages in order to increase its pressure. The separated oil is withdrawn from the separator vessel 50 via the second outlet 53 and is directed to the fluid treatment tank 1 for oil stabilization before being exported. The residence time for the well fluid in the separator vessel 50 is with advantage adjusted in order to obtain as long residence time as possible for the oil in the separator vessel so as to make it possible to obtain oil with very low water content out of the separator vessel.

The separated water, which comprises residues of oil and dissolved gas, is withdrawn from the separator vessel 50 via the first outlet 52 and conducted to the separation unit 60 via a conduit 41. In the separation unit 60, the water withdrawn from the separator vessel 50 is subjected to a second separating stage. The purpose of the separation unit 60 is to reduce the oil content of the water withdrawn from the separator vessel 50 to such a level, e.g. in the order of 2000 ppm or lower, that the water leaving the separation unit 60 via the outlet 62 has a quality suitable for treatment in the water treatment unit 80. In the water treatment unit 80, the oil content of the water is reduced further, e.g. to a level, typically 40 ppm or lower, required for allowing the water to be discharged to the sea. The water leaving the water treatment unit 80 is directed, via a conduit 42, to the fluid treatment tank 1. When entering the water treatment compartment 30 of the tank 1, the water is subjected to a pressure fall which may deploy the dissolved gas from the water and thereby create the effect of a flotation unit, which will give an additional purification of the water.

Reject fluid withdrawn from the separation unit 60 and the water treatment unit 80 are directed to the tank 1 via conduits 43 and 44, respectively, so as to be subjected to a further separating stage in the reject treatment compartment 20 of the tank 1. When entering the reject treatment compartment, said reject fluid is subjected to a pressure fall which deploys the gas and creates small bubbles. These bubbles enhance the separation of the oil from the water.

Figure 4:
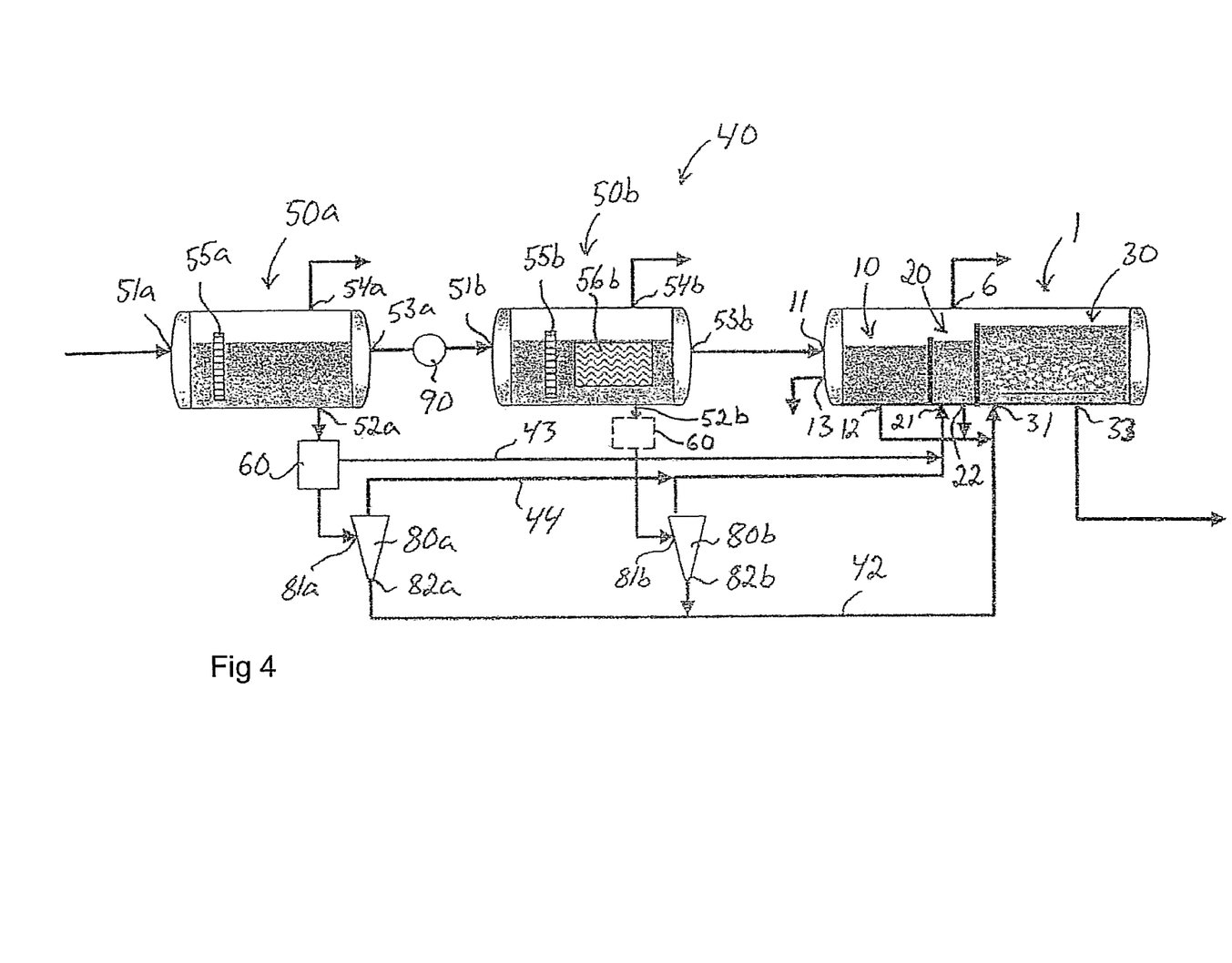
FIG. 4 is a schematic outline diagram illustrating a well fluid processing system according to a second embodiment of the present invention.

In the embodiment illustrated in FIG. 4, the well fluid processing system 40 comprises two separator vessels 50a, 50b, namely a high-pressure separator vessel 50a for gravitational separation of oil and water contents of well fluid and a low-pressure separator vessel 50b arranged to receive oil and/or emulsion withdrawn from the high-pressure separator vessel 50a. A heating device 90 may be arranged between the high-pressure separator vessel 50a and the low-pressure separator vessel 50b for heating the oil/emulsion supplied to the low-pressure separator vessel from the high-pressure separator vessel.

The high-pressure separator vessel 50a has an inlet 51a for receiving said well fluid, a first outlet 52a for withdrawing water from a lower part of the separator vessel, a second outlet 53a for withdrawing oil/emulsion from a higher part of the separator vessel, and a third outlet 54a for withdrawing gas from an upper part of the separator vessel. In order to speed up the gravitational separation, the separator vessel 50a may comprise a coalescing device 55a. This coalescing device 55a is suitably a coalescing unit of the type described with reference to FIG. 3.

The low-pressure separator vessel 50b has an inlet 51b for receiving oil/emulsion withdrawn from the high-pressure separator vessel 50a via the oil outlet 53a thereof, a first outlet 52b for withdrawing water from a lower part of the separator vessel, a second outlet 53b for withdrawing oil from a higher part of the separator vessel, and a third outlet 54b for withdrawing gas from an upper part of the separator vessel. In order to speed up the gravitational separation, the separator vessel 50b may comprise at least one coalescing device 55b, 56b. In the embodiment illustrated in FIG. 4, the low-pressure separator vessel 50b comprises a first coalescing device 55b in the form of a coalescing unit of the type described with reference to FIG. 3, and a second coalescing device 56b in the form of a dielectrophoresis unit of the type described with reference to FIG. 3 arranged in the separator vessel downstream of the first coalescing device 55b.

A separation unit 60 of the type described above with reference to FIG. 3 is arranged to receive water withdrawn from the high-pressure separator vessel 50a via the first outlet 52a. A separation unit 60 of the type described above with reference to FIG. 3 may also be arranged to receive water withdrawn from the low-pressure separator vessel 50b via the first outlet 52b. Furthermore, the system illustrated in FIG. 4 comprises two water treatment units 80a, 80b of the type described above with reference to FIG. 3. One of these water treatment units is arranged to receive water from the separation unit 60 and the other one is arranged to receive water withdrawn from the low-pressure separator vessel 50b via the first outlet 52b thereof.

The processing system 40 illustrated in FIG. 4 also comprises a low-pressure fluid treatment tank 1 of the type described above with reference to FIG. 1. The inlet 31 of the water treatment compartment 30 of the tank 1 is connected to the outlets 82a, 82b of the water treatment units 80a, 80b so as to receive water that has passed through the water treatment units. The inlet 21 of the reject treatment compartment 20 of the tank 1 is connected to the separation unit 60 and to the water treatment units 80a, 80b so as to receive reject fluid withdrawn by the extraction device of the separation unit from the water passing through the separation unit 60 and reject fluid withdrawn from the water passing through the water treatment units 80a, 80b. The inlet 11 of the oil treatment compartment 10 of the tank 1 is connected to the oil outlet 53b of the low-pressure separator vessel 50b so as to receive oil withdrawn from this separator vessel 50b.

Figure 5:
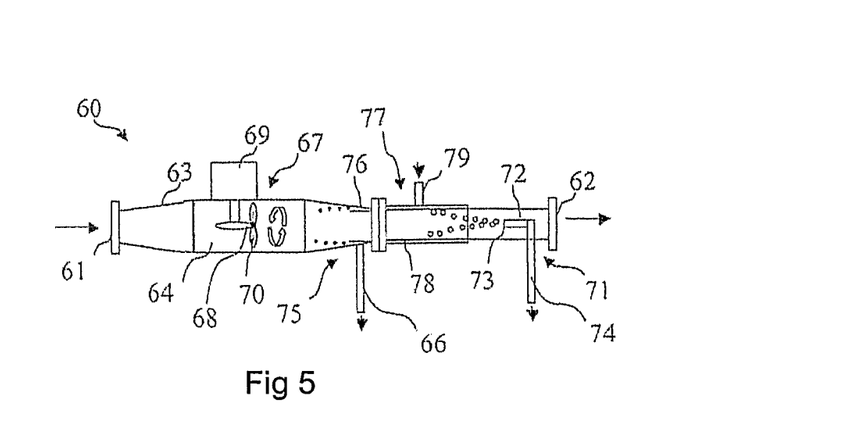
FIG. 5 is a schematic, partly cut sectional view of a separation unit included in the well fluid processing systems of FIGS. 3 and 4.

FIG. 5 illustrates a separation unit 60 for separating immiscible fluid components of different specific gravities, which is well suited for use in a system according to the invention. The separation unit 60 comprises a tubular body 63 provided with an internal flow channel 64 for a mixture of fluid components to be separated. The flow channel has an inlet 61 for receiving a fluid mixture to be separated and an outlet 62. The inlet 61 of the flow channel 64 of the separation unit is connected to the above-indicated first outlet 52, 52a of the high-pressure separator vessel 50, 50a so as to receive water with oil residues withdrawn from the separator vessel, and the outlet 62 of the flow channel 64 of the separation unit is connected to the inlet 81, 81a of the associated water treatment unit 80, 80a so as to supply water that have passed through the flow channel 64 of the separation unit to the water treatment unit 80, 80a for further separation therein.

The separation unit 60 is provided with a rotation generating device 67 for bringing received water to rotate about the longitudinal axis of the flow channel 64 as it flows through the flow channel between the inlet 61 and the outlet 62 thereof so as to thereby make immiscible fluid components of different specific gravities included in the water to migrate, under the action of centrifugal forces caused by the fluid rotation, towards mutually different parts of the flow channel. Fluid components of higher specific gravity will migrate towards the peripheral part of the flow channel, whereas fluid components of lower specific gravity, such as oil droplets, will migrate to the central part of the flow channel.

In the illustrated example, the rotation generating device 67 comprises an impeller 68 arranged in the flow channel 64 for bringing the water flow to rotate about the longitudinal axis of the flow channel. The impeller 68 is driven in rotation by a motor 69, e.g. in the form of an electric or hydraulic motor. The speed of the motor 69 is preferably adjustable so as to make possible an adjustment of the impeller speed and thereby an adjustment of the centrifugal force. Furthermore, the impeller 68 is suitably provided with impeller blades 70 having an adjustable inclination so as to thereby make possible an adjustment of the fluid pressure, which enhances the flexibility with respect to the installation of the separation unit in the processing system and the routing of the reject flow.

The impeller may be designed to give positive head if so needed in a system provided with the separation unit 60, e.g. if pumps arranged downstream of the separation unit have suction head limitations. A positive head from the separation unit 60 gives more flexibility with respect to the implementation of the separation unit in existing systems, since a positive head allows the reject flows from the separation unit to be more easily routed to appropriate destinations.

As an alternative to or in combination with an impeller, the rotation generating device 67 may comprise fluid injectors, not shown, arranged to inject fluid jets, e.g. in the form of gas jets, tangentially into the flow channel 64 so as to thereby bring the fluid mixture to rotate about the longitudinal axis of the flow channel.

The separation unit 60 comprises a first extraction device 71 for withdrawing, upstream of the outlet 62 of the flow channel, a central part of the rotating fluid mixture flowing through the flow channel 64. Thus, the first extraction device 71 is arranged to withdraw, from the rotating fluid mixture, lighter fluid components that have been concentrated at the central part of the flow channel 64. These withdrawn fluid components constitute reject fluid. In the illustrated example, the first extraction device 71 comprises a tubular collecting member 72 arranged centrally in the flow channel 64 and having an inlet opening 73 facing the upstream end of the flow channel. The collecting member 72 is connected to a discharge conduit 74, which may be arranged to feed the withdrawn fluid components, i.e. the reject fluid, to a fluid treatment tank 1 for further processing therein, as illustrated in FIGS. 3 and 4.

In the illustrated example, the separation unit 60 also comprises a second extraction device 75 for withdrawing a peripheral part of the rotating fluid mixture flowing through the flow channel 64. Thus, the second extraction device 75 is arranged to withdraw, from the rotating fluid mixture, heavier fluid components, such as sand particles or the similar that have been concentrated close to the inner wall of the flow channel 64. In the illustrated example, the second extraction device 75 comprises a collecting member 76 arranged at the inner wall of the flow channel 64 upstream of the first extraction device 71. The collecting member 76 is connected to a discharge conduit 66.

The separation unit 60 further comprises bubble producing means 77 for producing, upstream of the first extraction device 71 and at the periphery of the flow channel 64, micro-sized gas bubbles, so-called micro bubbles, in the fluid mixture flowing through the flow channel, upstream and/or downstream of the rotation generating device (67), so as to thereby enhance the separation of oil from the water. The collecting member 76 of the second extraction device 75 is arranged upstream of the section of the flow channel 64 where micro bubbles are produced by the bubble producing means 77.

In the illustrated embodiment, the bubble producing means 77 comprises a micro porous member 78 forming part of the wall of the flow channel 64, and gas feeding means 79 for feeding gas, e.g. in the form of compressed natural gas, through the micro porous member 78 so as to thereby generate micro bubbles. The bubble producing means 77 may comprise ultrasonic means, not shown, for generating ultrasonic waves, which are directed to the micro porous member 78 so as to subject it to vibration and thereby enhance the generation of finer bubbles with high sphericality and uniform size distribution.

As an alternative to or in combination with a micro porous member 78, the bubble producing means 77 may comprise high pressure nozzles, not shown, arranged to inject gas jets into the flow channel 64 so as to thereby generate micro bubbles. The bubble producing means 77 may comprise ultrasonic means for generating ultrasonic waves, which are directed to the high pressure nozzles so as to subject them to vibration and thereby enhance the generation of finer bubbles with high sphericality and uniform size distribution.

The introduction of micro-sized bubbles into the fluid mixture flowing through the flow channel, may as an alternative to or in any combination with e.g. the above-described embodiments be accomplished by tangential injection of gas, such as highly pressurized water which is gas saturated, upstream and/or downstream of the rotation generating device. Here the gas will be released by flashing into the fluid mixture due to a pressure reduction.

The micro bubbles preferably have a diameter smaller than the diameter of the smallest oil droplets contained in the water.

The separation unit 60 illustrated in FIG. 5 is capable of handling produced water containing up to about 3% by volume of oil, i.e. more than ten times the traditional limit for a conventional produced water treatment unit.

The invention is of course not in any way restricted to the embodiments described above. On the contrary, many possibilities to modifications thereof will be apparent to a man with ordinary skill in the art without departing from the basic idea of the invention such as defined in the appended claims.

The invention claimed is:

1. A fluid treatment tank for use in a well fluid processing system, the tank comprising:
   at least three compartments, including:
   an oil treatment compartment for receiving oil from a separator vessel of the well fluid processing system so as to allow stabilization and/or final separation and treatment of the oil;
   a reject treatment compartment for receiving reject fluid from one or more water treatment units of the well fluid processing system so as to allow gravitational separation of heavier and lighter components of the reject fluid; and
   a water treatment compartment for receiving de-oiled water from one or more water treatment units of the well fluid processing system so as to allow degassing and/or final separation of the water,
   wherein the reject treatment compartment comprises an outlet at a lower part, wherein the outlet is connected to an inlet of the water treatment compartment so as to allow fluid withdrawn from the lower part of the reject treatment compartment via said outlet to be introduced in the water treatment compartment via said inlet, and
   wherein the oil treatment compartment comprises an outlet at a lower part, wherein the outlet is connected to the inlet of the water treatment compartment so as to allow fluid withdrawn from the lower part of the oil treatment compartment via said outlet to be introduced in the water treatment compartment via said inlet.

2. The fluid treatment tank according to claim 1, wherein said compartments are mutually separated from each other in such a manner that fluid is allowed to flow from an upper part of the reject treatment compartment into the oil treatment compartment, but prevented from flowing from the upper part of the reject treatment compartment into the water treatment compartment.

3. The fluid treatment tank according to claim 2, wherein the reject treatment compartment is separated from the oil treatment compartment by a first partition wall having an upper edge located below a ceiling of the tank so as to allow fluid to flow over said upper edge from the upper part of the reject treatment compartment into the oil treatment compartment.

4. The fluid treatment tank according to claim 3, wherein said compartments are mutually separated from each other in such a manner that fluid is allowed to flow from an upper part of the water treatment compartment into the reject treatment compartment.

5. The fluid treatment tank according to claim 4, wherein the reject treatment compartment is separated from the water treatment compartment by a second partition wall having an upper edge located below the ceiling of the tank so as to allow fluid to flow over said upper edge from the upper part of the water treatment compartment into the reject treatment compartment.

6. The fluid treatment tank according to claim 5, wherein the upper edge of the first partition wall is located on a lower level in the tank than the upper edge of the second partition wall.

7. The fluid treatment tank according to claim 1, wherein the water treatment compartment comprises an inlet at its lower part for receiving said de-oiled water.

8. The fluid treatment tank according to claim 7, wherein the inlet is provided at the bottom of the water treatment compartment.

9. The fluid treatment tank according to claim 1, further comprising:

a bubble producer configured to produce gas bubbles in water introduced into or accumulated in the water treatment compartment so as to promote flotation of oil droplets contained in water received in the water treatment compartment.

10. The fluid treatment tank according to claim 1, wherein the reject treatment compartment comprises an inlet at a lower part for receiving said reject fluid.

11. The fluid treatment tank according to claim 1, wherein
the reject treatment compartment comprises an inlet for receiving said reject fluid;
a centrifugal inlet pipe is connected to said inlet of the reject treatment compartment, wherein reject fluid is guided into the reject treatment compartment through the centrifugal inlet pipe in a helical flow path therein so as to thereby allow immiscible fluid components of different specific gravities included in the reject fluid to migrate, under the action of centrifugal forces, towards mutually different parts of the inlet pipe;
a first outlet opening is arranged at the downstream end of the inlet pipe; and
second outlet openings are arranged in a wall of the inlet pipe upstream of the first outlet opening so as to allow heavier fluid components of the reject fluid to be discharged, under the action of centrifugal forces, from the inlet pipe through the second outlet openings upstream of the first outlet opening.

12. The fluid treatment tank according to claim 1, further comprising:
a coalescing device arranged in an upper part of the reject treatment compartment in order to promote coalescence of water droplets in oil accumulated in the upper part of the reject treatment compartment.

13. The fluid treatment tank according to claim 12, wherein the coalescing device arranged in the reject treatment compartment comprises a dielectrophoresis unit, which has at least one pair of sheets spaced close to each other with a mutual distance between the sheets varying along the sheets as seen in a direction perpendicular to an intended flow direction of fluid passing between the sheets, wherein an electrical potential is applied to the sheets so as to promote coalescence of water droplets in oil of the upper part of the reject treatment compartment passing between the sheets.

14. The fluid treatment tank according to claim 1, further comprising:
a coalescing device arranged in the oil treatment compartment in order to promote coalescence of water droplets in oil accumulated in the oil treatment compartment.

15. The fluid treatment tank according to claim 14, wherein the coalescing device arranged in the oil treatment compartment comprises a dielectrophoresis unit, which has at least one pair of sheets spaced close to each other with a mutual distance between the sheets varying along the sheets as seen in a direction perpendicular to an intended flow direction of fluid passing between the sheets, an electrical potential being applied to the sheets so as to promote coalescence of water droplets in oil of the oil treatment compartment passing between the sheets.

16. The fluid treatment tank according to claim 1, further comprising:
a gas outlet arranged at an upper part of the tank so as to allow withdrawal of gas from the tank.

17. A well fluid processing system, comprising:
at least one separator vessel for gravitational separation of oil and water contents of well fluid,
a water treatment unit for de-oiling water withdrawn from the separator vessel,
a fluid treatment tank comprising at least three compartments, including an oil treatment compartment for receiving oil from a separator vessel of the well fluid processing system so as to allow stabilization and/or final separation and treatment of the oil, a reject treatment compartment for receiving reject fluid from one or more water treatment units of the well fluid processing system so as to allow gravitational separation of heavier and lighter components of the reject fluid, and a water treatment compartment for receiving de-oiled water from one or more water treatment units of the well fluid processing system so as to allow degassing and/or final separation of the water, wherein the oil treatment compartment of the fluid treatment tank is connected to the separator vessel so as to receive oil withdrawn from the separator vessel, the reject treatment compartment of the fluid treatment tank is connected to the water treatment unit so as to receive reject fluid withdrawn from the water treatment unit, and the water treatment compartment of the fluid treatment tank is connected to the water treatment unit so as to receive water de-oiled by the water treatment unit.

18. The well fluid processing system according to claim 17, wherein the water treatment unit comprises one or several hydrocyclones.

19. The well fluid processing system according to claim 17, wherein the separator vessel comprises at least one coalescing device for promoting coalescence of water droplets in fluid accumulated in the separator vessel.

20. The well fluid processing system according to claim 19, wherein the separator vessel comprises a coalescing device comprising a coalescing unit having a plurality of flow channels to which an electrical potential is applied so as to cause water droplets in fluid of the separator vessel flowing through the flow channels to coalesce into larger droplets.

21. The well fluid processing system according to claim 20, wherein the separator vessel comprises a coalescing device comprising a dielectrophoresis unit, which has at least one pair of sheets spaced close to each other with the mutual distance between the sheets varying along the sheets as seen in a direction perpendicular to the intended flow direction of fluid passing between the sheets, an electrical potential being applied to the sheets so as to promote coalescence of water droplets in fluid of the separator vessel passing between the sheets.

22. The well fluid processing system according to claim 21, wherein the dielectrophoresis unit is located in the separator vessel downstream of the coalescing unit.

23. The well fluid processing system according to claim 17, wherein
the system further comprises a separation unit, which is arranged between the separator vessel and the water treatment unit and which is arranged to receive water withdrawn from the separator vessel;
the separation unit comprises a bubble producer configured to produce micro-sized gas bubbles in said water, said gas bubbles being allowed to migrate through the water so as to come into contact with and carry along oil droplets included in the water, the separation unit further comprising an extraction device for withdrawing the gas bubbles and said oil droplets from the water in the separation unit so as to thereby reduce the oil content of the water passing through the separation unit; and
the water treatment unit is arranged to receive water de-oiled by the separation unit.

24. The well fluid processing system according to claim 23, wherein the reject treatment compartment of the fluid treatment tank is connected to the separation unit so as to receive reject fluid withdrawn from the separation unit.

25. The well fluid processing system according to claim 23, wherein
the separation unit comprises a body provided with an internal flow channel having an inlet for receiving water withdrawn from the separator vessel and an outlet, and a rotation generating device for bringing the water to rotate about the longitudinal axis of the flow channel as it flows through the flow channel between the inlet and the outlet thereof so as to thereby make immiscible fluid components of different specific gravities included in the water to migrate, under the action of centrifugal forces, towards mutually different parts of the flow channel;
the bubble producer is arranged to produce the gas bubbles in the water upstream of the extraction device and at the periphery of the flow channel; and
the extraction device is arranged to withdraw gas bubbles and oil droplets gathered at a central part of the flow channel.

26. The well fluid processing system according to claim 17, wherein
said separator vessel comprises a low-pressure separator vessel;
the system further comprises a high-pressure separator vessel for gravitational separation of oil and water contents of well fluid; and
the low-pressure separator vessel is arranged to receive oil and/or emulsion withdrawn from the high-pressure separator vessel.

27. The well fluid processing system according to claim 26, wherein the high-pressure separator vessel comprises a coalescing device for promoting coalescence of water droplets in fluid in the high-pressure separator vessel.

28. The well fluid processing system according to claim 27, wherein the high-pressure separator vessel comprises a coalescing device comprising a coalescing unit having a plurality of flow channels to which an electrical potential is applied so as to cause water droplets in fluid of the high-pressure separator vessel flowing through the flow channels to coalesce into larger droplets.

29. The well fluid processing system according to claim 26, further comprising:
a heating device arranged between the high-pressure separator vessel and the low-pressure separator vessel for heating the oil/emulsion supplied to the low-pressure separator vessel from the high-pressure separator vessel.

30. The well fluid processing system according to claim 26, further comprising:
a second water treatment unit for de-oiling water withdrawn from the high-pressure separator vessel.

31. The well fluid processing system according to claim 30, wherein the second water treatment unit comprises one or several hydrocyclones.

32. The well fluid processing system according to claim 30, wherein the reject treatment compartment of the fluid treatment tank is connected to the second water treatment unit so as to receive reject fluid withdrawn from the second water treatment unit, and wherein the water treatment compartment of the fluid treatment tank is connected to the second water treatment unit so as to receive water de-oiled by the second water treatment unit.

33. The well fluid processing system according to claim 30, further comprising:
a separation unit arranged between the high-pressure separator vessel and the second water treatment unit and which is arranged to receive water withdrawn from the high-pressure separator vessel,
wherein the separation unit comprises a bubble producer configured to produce micro-sized gas bubbles in said water, said gas bubbles being allowed to migrate through the water so as to come into contact with and carry along oil droplets included in the water, the separation unit further comprising an extraction device for withdrawing the gas bubbles and said oil droplets from the water in the separation unit so as to thereby reduce the oil content of the water passing through the separation unit, and
wherein the second water treatment unit is arranged to receive water de-oiled by the separation unit.

* * * * *